(12) United States Patent
Markle et al.

(10) Patent No.: US 7,292,959 B1
(45) Date of Patent: Nov. 6, 2007

(54) TOTAL TOOL CONTROL FOR SEMICONDUCTOR MANUFACTURING

(75) Inventors: Richard J. Markle, Austin, TX (US); Thomas J. Sonderman, Austin, TX (US)

(73) Assignee: Advanced Mirco Devices, Inc., Austin, TX (US)

( * ) Notice: Subject to any disclaimer, the term of this patent is extended or adjusted under 35 U.S.C. 154(b) by 0 days.

(21) Appl. No.: 11/342,759

(22) Filed: Jan. 30, 2006

(51) Int. Cl.
*G06F 19/00* (2006.01)
(52) U.S. Cl. .......................... 702/182; 714/25
(58) Field of Classification Search ............... 702/182, 702/183–185, 188; 700/42, 121; 438/16
See application file for complete search history.

(56) References Cited

U.S. PATENT DOCUMENTS 6,999,836 B2 * 2/2006 Schwarm et al. ........... 700/121
7,030,957 B2 * 4/2006 Dishon et al. ................ 355/27

* cited by examiner

*Primary Examiner*—Edward Raymond
(74) *Attorney, Agent, or Firm*—Williams, Morgan & Amerson

(57) ABSTRACT

The present invention provides a method and apparatus for controlling processing tools and related control units. The method includes accessing information indicative of at least one excursion of at least one processing tool detected by a first control unit associated with the at least one processing tool. The method also includes determining at least one action to be taken by at least one second control unit associated with the at least one processing tool based on the information indicative of said at least one excursion.

39 Claims, 3 Drawing Sheets

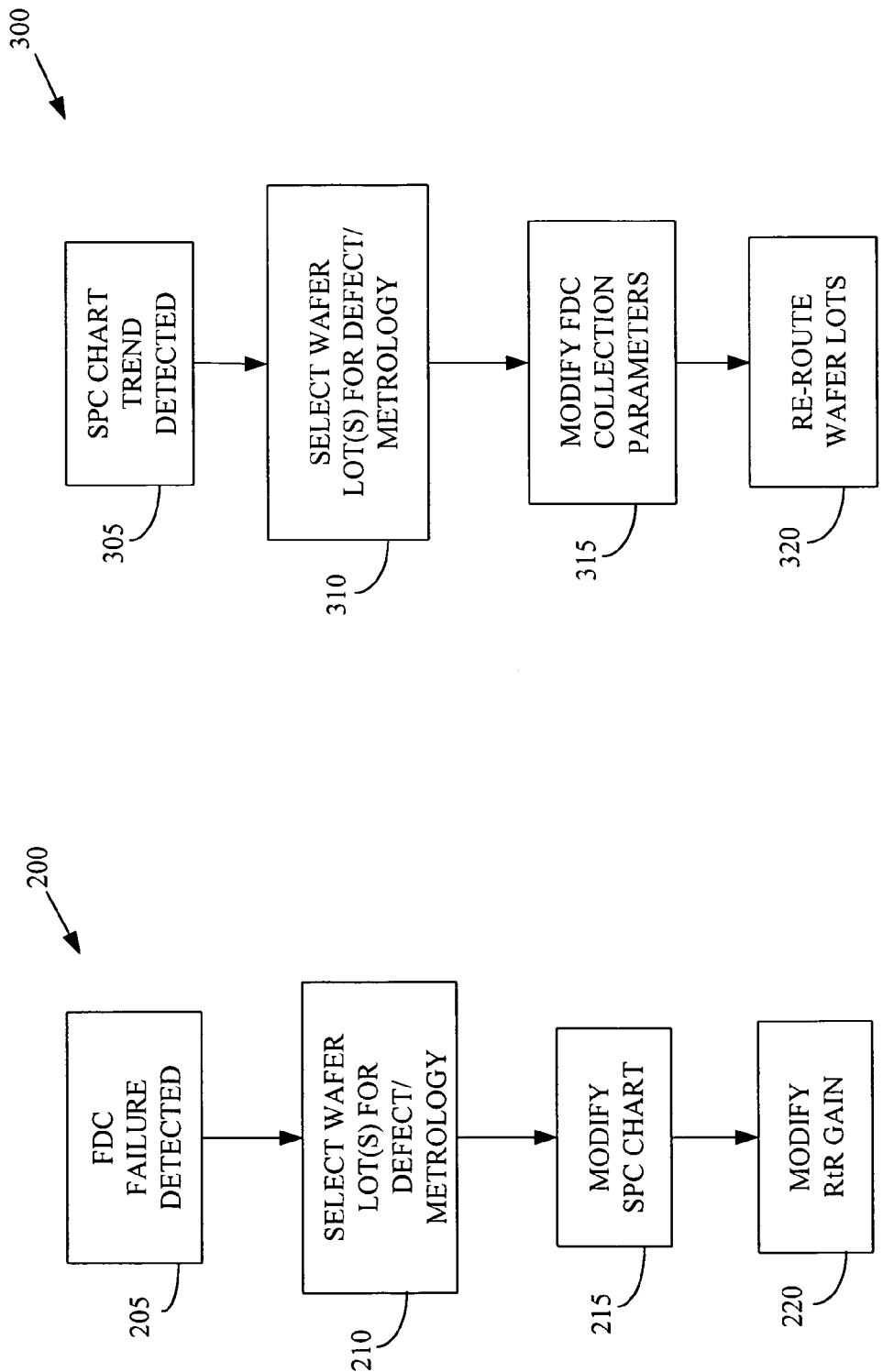

TOTAL TOOL CONTROL FOR SEMICONDUCTOR MANUFACTURING

BACKGROUND OF THE INVENTION

1. Field of the Invention

This invention relates generally to semiconductor manufacturing and, more particularly, to total tool control for semiconductor manufacturing.

2. Description of the Related Art

A semiconductor fabrication facility typically includes numerous processing tools used to fabricate semiconductor devices. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular product design and/or operating recipe so that a desired product is formed in or on the wafer. For example, a photolithography stepper may be used to form a patterned layer of photoresist above the wafer. Features in the patterned layer of photoresist correspond to a plurality of features, e.g. gate electrode structures, which will ultimately be formed above the surface of the wafer.

Operation of the processing tools in the semiconductor fabrication facility is generally monitored and/or controlled by a variety of control units, each of which is responsible for a different aspect of the fabrication process. For example, the semiconductor fabrication facility may include one or more electrical test monitors for monitoring results of electrical tests performed on completed products. The semiconductor fabrication facility may also include one or more statistical process control (SPC) units, run-to-run (RtR) controllers, fault detection and control (FDC) units, dynamic adaptive sampling controllers, and the like. The control units in the semiconductor fabrication facility operate largely independently of one another. For example, the statistical process control units may make decisions regarding operation of one or more processing or metrology tools based on statistical process control charts formed with information collected from the processing or metrology tools. However, the statistical process controllers may not account for data collected by, or actions taken by, other control units such as the run-to-run (RtR) controllers, the fault detection and control (FDC) units, and the dynamic adaptive sampling controllers.

Failing to account for data collected by, or actions taken by, other control units may reduce the ability of the semiconductor fabrication facility to detect potential problems associated with one or more of the processing tools. For example, the fault detection and control unit may detect faults in processed wafers using metrology data collected from the processed wafers, which may trigger a modification in some aspect of the processing performed by one or more of the processing tools. However, since the fault detection and control unit operates independently of the other control units, the other control units may not be able to take actions that may compensate for, or supplement, the efforts of the fault detection and control unit. In some cases, one or more of the control units may take actions that directly conflict with the actions taken by other control units. Consequently, the control units' ability to anticipate problems with one or more tools and/or take corrective actions when problems are detected, may be limited by the functional independence of the control units.

The independence of the various control units may also limit (or eliminate) the control units' ability to cross check decisions made by different control units. For example, one fault detection control unit may be less reliable than other fault detection control units in the semiconductor fabrication facility. However, it may not be possible to use the more reliable fault detection control units to verify decisions made by the less reliable fault detection control unit. Consequently, processing tools may be erroneously taken out of production, or erroneously allowed to continue production, by the less reliable fault detection control unit.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for controlling processing tools and related control units. The method includes accessing information indicative of at least one excursion of at least one processing tool detected by a first control unit associated with the at least one processing tool. The method also includes determining at least one action to be taken by at least one second control unit associated with the at least one processing tool based on the information indicative of said at least one excursion.

In one embodiment of the present invention, an apparatus is provided for controlling processing tools and related control units. The apparatus includes at least one processing tool, a first control unit, and at least one second control unit. The first and second control units are associated with the at least one processing tool. The apparatus also includes a controller configured to access information indicative of at least one excursion of the at least one processing tool detected by the first control unit and determine at least one action to be taken by the at least one second control unit based on the information indicative of the at least one excursion.

BRIEF DESCRIPTION OF THE DRAWINGS

The invention may be understood by reference to the following description taken in conjunction with the accompanying drawings, in which like reference numerals identify like elements, and in which:

FIGS. 2-5 conceptually illustrate exemplary embodiments of methods of coordinating the actions of multiple independent control units, in accordance with the present invention.

Figure 1:
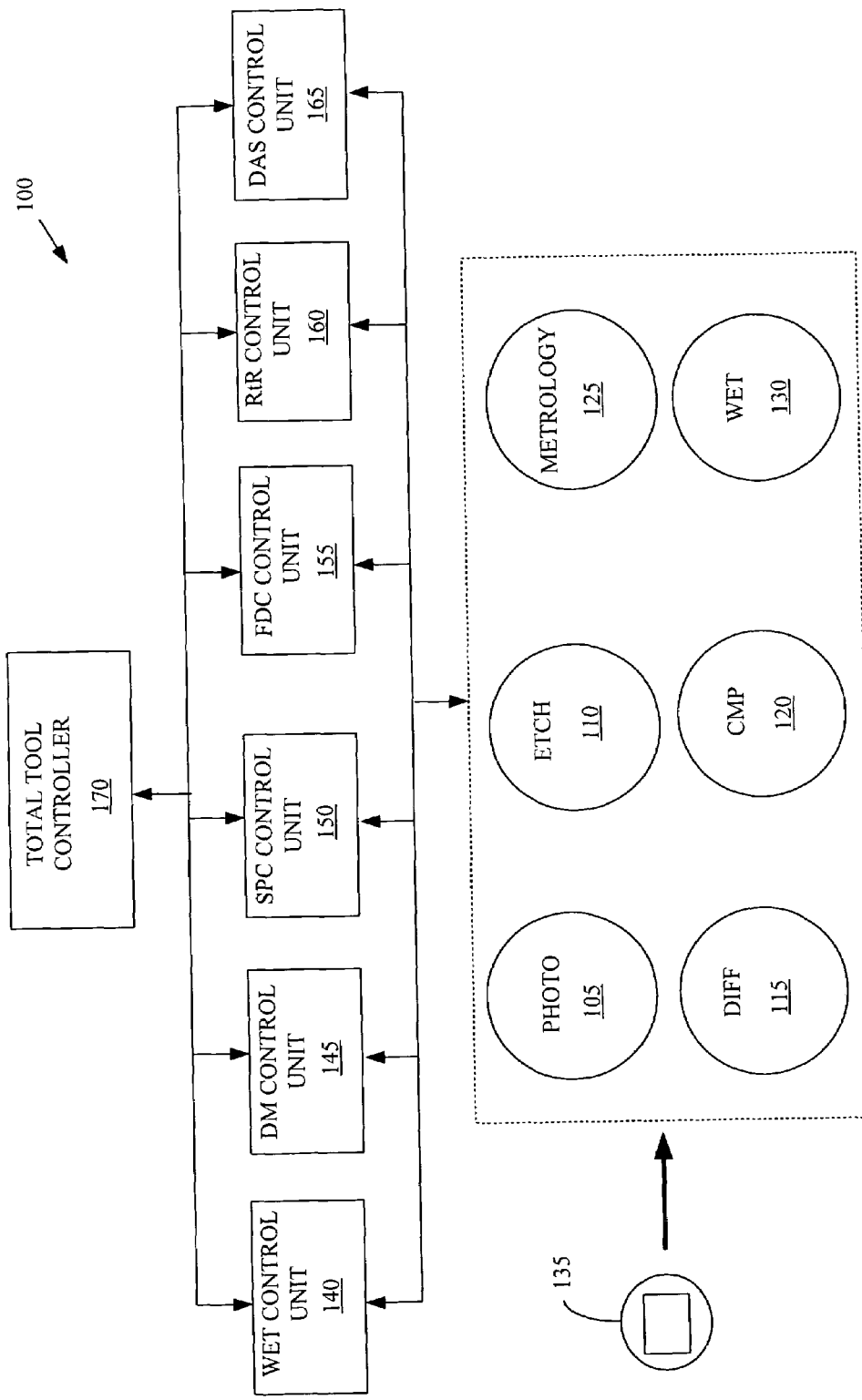
FIG. 1 conceptually illustrates one exemplary embodiment of a semiconductor manufacturing facility, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a semiconductor manufacturing facility 100. In the interest of clarity, the various elements and/or components of a semiconductor manufacturing facility 100 will be depicted in schematic block diagrams. The physical layout of the manufacturing facility 100 will not necessarily correspond to the layout depicted in FIG. 1. The various interconnections between the elements and/or components will also be schematically depicted using arrows. The physical layout of the manufacturing facility 100, as well as the physical, communicative, and/or electrical interconnections between portions of the manufacturing facility 100, are considered matters of design choice and are not material to the present invention. Persons of ordinary skill in the art having benefit of the present disclosure should be able to implement specific layouts and the appropriate interconnections of the elements and/or components of the manufacturing facility 100 described herein.

In the illustrated embodiment, the manufacturing system 100 includes various processing tool groups such as groups of photolithography steppers 105, etch tools 110, diffusion tools 115, chemical mechanical polishing (CMP) tools 120, and the like. In the interest of clarity, only a few processing tool groups are depicted in FIG. 1. However, persons of ordinary skill in the art having benefit of the present disclosure should appreciate that the present invention is not limited to the processing tool groups 105, 110, 115, 120. In alternative embodiments, the manufacturing system 100 may include other tools or tool groups including, but not limited to, ion implantation tools, rapid thermal annealing tools, and the like. The manufacturing system 100 may also include groups of metrology tools 125 (e.g., scatterometers, ellipsometers, and the like) and/or wafer electrical testing tools 130. Each of the groups 105, 110, 115, 120, 125, 130 may include one or more individual tools (not shown), as well as one or more tool controllers (not shown) that may be used to control operation of the tools within each group 105, 110, 115, 120, 125, 130.

In operation, one or more workpieces (e.g., wafers or wafer lots) 135 may be processed by the manufacturing system 100 to form one or more products in or on the workpieces 135. For example, workpieces 135 may be provided to the various tool groups 105, 110, 115, 120, 125, 130 or the individual tools located therein, when demanded by or scheduled for processing. The workpieces 135 may be processed and/or monitored by one or more of the tools in the tool groups 105, 110, 115, 120, 125, 130 in accordance with an operating recipe. For example, the workpiece 135 may be provided to tools in the groups 105, 110, 115, 120, 125, 130 which may then form one or more gate electrode structures in or on the workpiece 135, in accordance with one or more operating recipes that may be provided to the tool groups 105, 110, 115, 120, 125, 130. Techniques for processing the workpieces 135 in the manufacturing system 100 to form various structures and/or products in or on the workpieces 135 are known to persons of ordinary skill in the art and, in the interest of clarity, only those aspects of processing the workpieces 135 that are relevant to the present invention will be discussed further herein.

The manufacturing system 100 also includes controllers or control units that may be used to control one or activities related to processing workpieces 135 in the manufacturing system 100. The terms "control unit" and "controller" are considered synonymous and may therefore be used interchangeably herein. Persons of ordinary skill in the art should appreciate that the various control units or controllers in the manufacturing system 100 may be implemented in hardware, firmware, software, or any combination thereof. Persons of ordinary skill in the art should also appreciate that the control units shown in FIG. 1 are intended to be illustrative and not to limit the present invention. In alternative embodiments, more or fewer control units may be used to perform similar or different functions than the control units described below. Techniques for implementing and/or operating the control units discussed below are known in the art and, in the interest of clarity, only those aspects of implementing and/or operating the control units that are relevant to the present invention will be discussed herein.

In the illustrated embodiment, the manufacturing system 100 includes a wafer electrical testing (WET) control unit 140, which may be configured to monitor operation of the wafer electrical testing tools 130. For example, the WET control unit 140 may receive information indicative of the state(s) of one or more of the tools in the wafer electrical testing tool group 130, as well as information indicative of the results of wafer electrical tests that may be performed on the workpieces 135. The WET control unit 140 may then provide one or more control signals to one or more of the tools and/or controllers in the WET tool group 130. The tools and/or controllers in the WET tool group 130 may then use these control signals in current or future wafer electrical testing.

The manufacturing system 100 may also include a defect monitoring (DM) control unit 145. In one embodiment, the defect monitoring control unit 145 may be configured to monitor results of metrology performed by one or more metrology tools in the metrology tool group 125. For example, the metrology tool group 125 may provide information indicative of defect densities associated with the workpieces 135, as well as information indicative of the states of one or more of the tools in the metrology tool group 125. The defect monitoring control unit 145 may provide one or more control signals to one or more of the tools in the metrology tool group 125, which may then use the control signals for performing metrology on the workpieces 135. In one embodiment, the control signals may be formed based on the information received from the metrology tool group 125.

A statistical process control (SPC) unit 150 may be included in the manufacturing system 100. In one embodiment, a statistical process control unit 150 may form one or more charts including information indicative of one or more properties of the workpieces 135 being processed by the manufacturing system 100. For example, the statistical process control unit 150 may chart critical dimensions (e.g., of gate electrode structures) measured by tools in the metrology tool group 125, defect densities associated with source/drain etching and/or shallow trench isolation etching, and the like. The statistical process control unit 150 may form the charts based on parameters such as a defect sensitivity, a defect size, a percentage of workpieces 135 to be charted, a number of wafers per wafer lot to be charted, and the like. The statistical process control charts may indicate trends in the charted parameters, such as an increasing and/or decreasing average critical dimension of a gate electrode structure. Critical statistical process control charts may indicate a fault or failure associated with one or more processing tools.

In the illustrated embodiment, the manufacturing system 100 includes a fault detection and control (FDC) unit 155, which may be used to monitor one or more of the tool groups 105, 110, 115, 120, 125, 130. The fault detection and control unit 155 may detect faults associated with processing workpieces 135 in these tools by monitoring alarm conditions. The fault detection and control unit 155 may also provide a control signal indicating one or more corrective actions in response to detecting one or more faults. The particular corrective action may vary depending on the particular implementation and the nature of the alarm condition. Exemplary automatic actions include automatically shutting the tool down, aborting the current wafer, suspending subsequent wafers, and the like.

In the illustrated embodiment, the manufacturing system 100 includes a run-to-run control unit 160, which may be used to monitor tool state information and/or wafer state information associated with processing workpieces 135 in one or more of the tool groups 105, 110, 115, 120, 125, 130. The workpieces 135 are typically processed according to an operating recipe, which may be provided by the run-to-run control unit 160. In one embodiment, the run-to-run control unit 160 may modify the operating recipe based upon tool state information and/or wafer state information. The run-to-run control unit 160 may then provide a modified operating recipe to one or more of the tool groups 105, 110, 115, 120, 125, 130, which may then process workpieces 135 according to the modified operating recipe.

A dynamic adaptive sampling (DAS) control unit 165 may also be implemented in the manufacturing system 100. In the illustrated embodiment, the dynamic adaptive sampling control unit 165 may be used to monitor and/or adjust sampling rates associated with processing of the workpieces 135. For example, the dynamic adaptive sampling control unit 165 may determine sampling rates for tools in the metrology tool group 125 and/or the wafer electrical test tool group 130. Control signals indicating the determined sampling rates may then be provided to the appropriate tools, which may then modify their sampling rates accordingly. In one embodiment, the dynamic adaptive sampling control unit 165 may control the sampling rates so that a selected group of tools is adequately sampled.

The control units 140, 145, 150, 155, 160, 165 are communicatively coupled to a total tool controller 170. Persons of ordinary skill in the art having benefit of the present disclosure should appreciate that the total tool controller 170 may be implemented in hardware, firmware, software, or any combination thereof. The total tool controller 170 coordinates operation of the various control units 140, 145, 150, 155, 160, 165 in the manufacturing system 100. In one embodiment, the total tool controller 170 coordinates operation to attempt to optimize performance of the manufacturing system 100. For example, the total tool controller 170 may provide information to the control units 140, 145, 150, 155, 160, 165 so that, in operation, the contamination free manufacture defect levels are minimized. Accordingly, the individual control units 140, 145, 150, 155, 160, 165, and/or the tools controlled by these units, may or may not perform their individual tasks at an optimum level, even though the manufacturing system 100 may be operating at a higher overall performance level.

The total tool controller 170 may access information indicative of excursions of the processing tools that may be detected by one or more of the control units 140, 145, 150, 155, 160, 165. As used herein, the term "excursion" refers to any state or condition that deviates from an expected or desired state or condition. Accordingly, excursions may include faults detected by the fault detection and control unit 155, trends in one or more statistical process control charts, critical statistical process control charts, trends or failures detected by the wafer electrical test control unit 140, and the like. The total tool controller 170 may then determine one or more actions to be taken by one or more of the control units 140, 145, 150, 155, 160, 165 based on the detected excursion. In particular, the total tool controller 170 may determine coordinated actions to be taken by the control unit that detected the excursion and one or more other control units.

FIGS. 2-5 conceptually illustrate exemplary embodiments of methods 200, 300, 400, 500 of coordinating the actions of multiple independent control units using a controller such as the total tool controller 170 shown in FIG. 1. However, persons of ordinary skill in the art having benefit of the present disclosure should appreciate that the exemplary embodiments are intended to be illustrative and not to limit the present invention. In alternative embodiments, other methods of coordinating the response of multiple control units to excursions of one or more processing tools may be used.

Referring now to the first exemplary embodiment of the method 200 depicted in FIG. 2, a fault detection and control failure may be detected (at 205). For example, the fault detection and control unit 155 shown in FIG. 1 may detect an FDC failure and may provide a signal indicative of the failure to a coordinating controller, such as the total tool controller 170 shown in FIG. 1. The coordinating controller may then determine one or more actions to be taken by other controllers in response to receiving the signal indicative of the fault detection and control failure. In the illustrated embodiment, the coordinating controller selects (at 210) wafers and/or wafer lots associated with the fault detection and control failure for defect monitoring or other metrology. For example, the selected wafers and/or wafer lots may be marked for contamination free manufacture defect monitoring and/or additional metrology. The coordinating controller may provide signals indicative of the determined actions to a dynamic adaptive sampling control unit, which may use the signals to route the selected wafers and/or wafer lots to the appropriate tools and to control operation of these tools. For example, the dynamic adaptive sampling unit may increase the fraction of wafers that are inspected for defects and/or provided to metrology tools to as much as 100%.

The coordinating controller may also determine that one or more statistical process control charts should be modified (at 215). In one embodiment, the statistical process control charts may be modified (at 215) to compensate for the additional wafers and/or wafer lots that have been selected (at 210) for additional defect monitoring and/or other metrology, as discussed above. For example, the statistical process control charts may be modified (at 215) so that parameters associated with the normal number of wafers are plotted on the statistical process control charts, despite the increase in the number of wafers and/or wafer lots being inspected or provided to metrology tools.

One or more gains associated with one or more parameters used by a run-to-run control unit may also be modified (at 220) by the coordinating controller in response to the FDC signal indicating a failure. In one embodiment, the gain may be modified (at 220) to dampen parameters associated with the FDC failure. For example, if the FDC failure is associated with errors in a critical dimension, a gain associated with a critical dimension may be reduced to dampen the effect of the critical dimension on run-to-run control. Alternatively, one or more gains may be modified (at 220) to shift the run-to-run control from the failed parameter to other parameters associated with the processing. For example, if the FDC failure is associated with errors in a critical dimension, gains associated with the critical dimension and a layer thickness may be modified (at 220) to shift the run-to-run control from the critical dimension to the layer thickness.

Referring now to the second exemplary embodiment of the method 300 depicted in FIG. 3, a trend in a statistical process control chart may be detected (at 305). For example, a statistical process control unit may detect (at 305) an increase in a critical dimension plotted on a statistical process control chart. For another example, the statistical process control units may detect (at 305) an increase in a defect density associated with etching source and drain regions or shallow trench isolation regions. The coordinating controller may use this information to determine that one or more wafers and/or wafer lots should be selected (at 310) for additional defect inspection and/or metrology. In one embodiment, the coordinating controller may determine that the selected wafers and/or wafer lots should be inspected or provided to metrology tools for inspection or metrology using more sensitive settings, e.g., setting that may allow the metrology tools or CFM tools to detect smaller defects, larger defects, or may have a higher critical dimension sensitivity. The coordinating controller may provide the information associated with the selected wafers to the run-to-run control unit, the statistical process control unit, and any other control units.

The coordinating controller may also determine that the parameters collected by the fault detection and control unit should be modified (at 315). In one embodiment, the coordinating controller determines that the number of parameters monitored by the fault detection and control system should be increased in response to detecting (at 305) the statistical process control chart trend. The coordinating controller may then provide information indicating the number of parameters, as well as which parameters, to the fault detection and control unit and any other control units.

In one embodiment, the coordinating controller determines that wafers and/or wafer lots that are being processed, or will be processed, are to be rerouted (at 320) to other processing tools that are not associated with the trend in the statistical process control chart. For example, the coordinating controller may determine which processing tools were used to process wafers and/or wafer lots that exhibited the trend in the statistical process control chart. The coordinating controller may then provide information indicative of these processing tools to the dynamic adaptive sampling control unit so that the dynamic adaptive sampling control unit can reroute (at 320) wafers and/or wafer lots to other tools that do not exhibit the trend in the statistical process control chart.

Figures 4, 5:
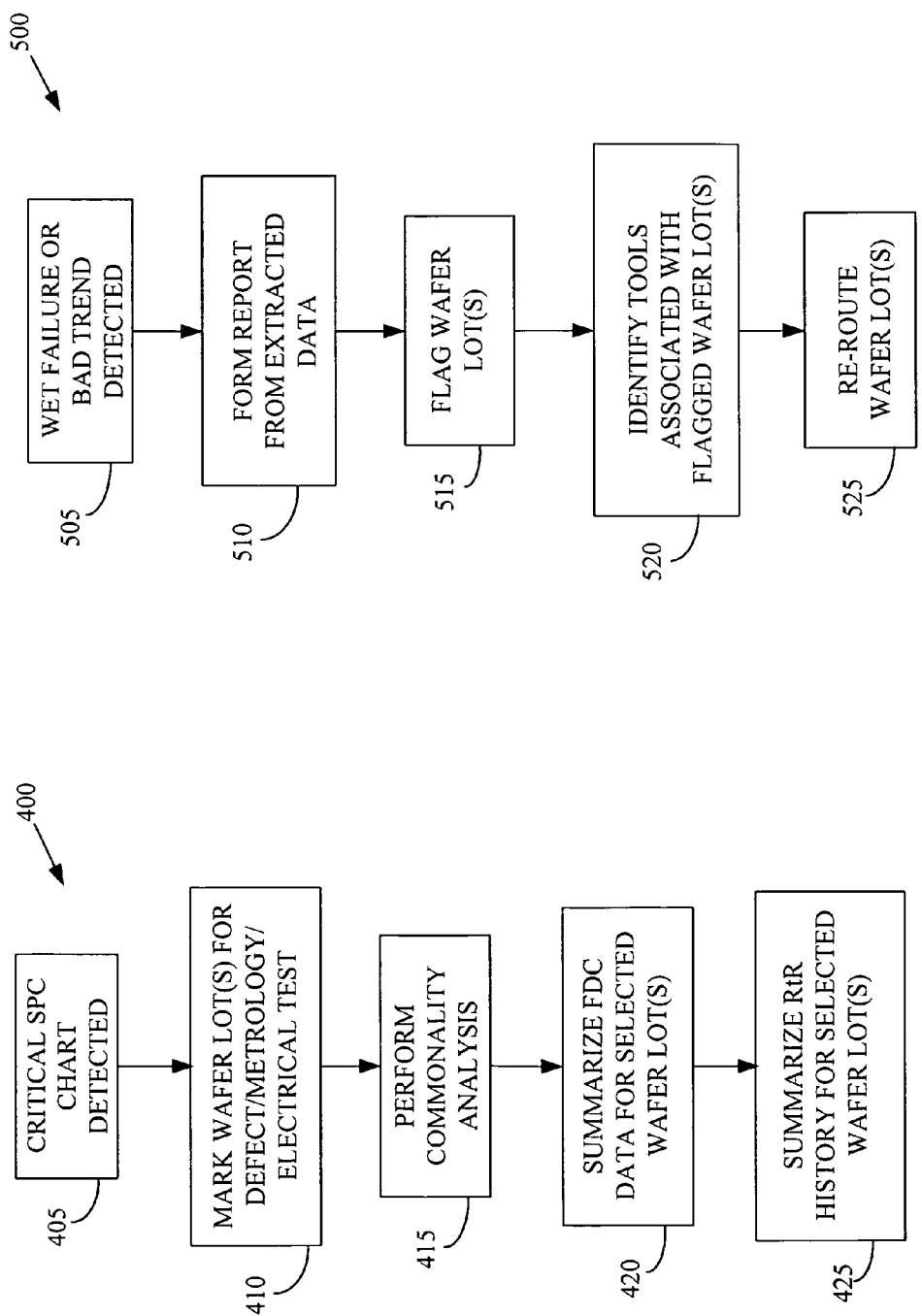

Referring now to the third exemplary embodiment of the method 400 depicted in FIG. 4, a critical statistical process control chart may be detected (at 405). For example, a statistical process control unit may detect (at 405) an increase in a critical dimension above (or below) a threshold value of the critical dimension associated with a statistical process control chart. For another example, the statistical process control units may detect (at 405) an increase in a defect density above (or below) a threshold value for the defect density. The coordinating controller may use this information to determine that one or more wafers and/or wafer lots should be selected (at 410) for additional inspection, metrology, and/or wafer electrical testing. In one embodiment, the coordinating controller may also associate the selected wafers and/or wafer lots with a high priority. The coordinating controller may provide the information associated with the selected wafers to the dynamic adaptive sampling control unit, the run-to-run control unit, the statistical process control unit, the WET control unit, and any other control units.

The coordinating controller may also perform (at 415) a commonality analysis using related wafers and/or wafer lots. In one embodiment, the coordinating controller performs (at 415) the commonality analysis using wafers and/or wafer lots that have the same heritage as one or more wafers and/or wafer lots associated with the critical statistical process control chart. For example, the coordinating controller may select a plurality of wafers and/or wafer lots that were processed using at least some of the same processing tools as the wafers and/or wafer lots associated with the critical statistical process control chart. The coordinating controller may then perform (at 415) the commonality analysis on the selected wafers. In one embodiment, the coordinating controller may collect data for performing (at 415) the commonality analysis from, and provide information indicative of the commonality analysis to, any of the control units.

The coordinating controller may also collect data from one or more control units and provide reports based upon the collected data. In one embodiment, data collected by the fault detection and control unit may be accessed by the coordinating controller, which may summarize (at 420) the collected fault detection and control data. The coordinating controller may form a report based on the collected fault detection and control data and provide this report, e.g., to an engineer and/or tool owner. For example, the coordinating controller may collect and summarize (at 420) fault detection and control data associated with five wafer lots processed prior to the critical statistical process control chart and five wafer lots processed subsequent to the critical statistical process control chart. In another embodiment, data collected by the run-to-run control unit may be accessed by the coordinating controller, which may summarize (at 425) the collected run-to-run data. The coordinating controller may form a report based on the collected run-to-run data and provide this report, e.g., to an engineer and/or tool owner. For example, the run-to-run history for the last 10 wafer lots may be summarized and a report may be provided.

Referring now to the fourth exemplary embodiment of the method 500 depicted in FIG. 5, a bad trend or a critical result of a wafer electrical test may be detected (at 505). A bad trend in the results of a wafer electrical test, or outright failure of one or more wafer electrical tests, are generally considered serious and may result in shutdown of one or more processing tools. When the coordinating controller detects (at 505) a wafer electrical test failure or a bad trend in the wafer electrical tests, data associated with one or more control units may be extracted by the coordinating controller. In one embodiment, the extracted data includes fault detection and control data associated with the bad wafer lots, metrology data associated with the bad wafer lots, statistical process control charts associated with the bad wafer lots, run-to-run control unit performance for the tools that may have processed the bad wafer lots, and the like. The coordinating controller may then form (at 510) a report based on the extracted data and may provide this report, e.g., to an engineer and/or tool owner.

The coordinating controller may also flag (at 515) one or more wafers and/or wafer lots that may have had critical statistical process control charts and/or fault detection and control unit failures. In one embodiment, the coordinating controller flags (at 515) the wafers and/or wafer lots that had critical statistical process control charts and/or fault detection and control unit failures on relatively large run-to-run shifts. The coordinating controller may then identify (at 520) one or more processing tools associated with the flagged wafers and/or wafer lots and provide information indicating the identified processing tools to the dynamic adaptive sampling control unit. The dynamic adaptive sampling control unit may then reroute (at 525) wafer lots to one or more processing tools that were not identified as being associated with the flagged wafers and/or wafer lots. In one embodiment, the dynamic adaptive sampling control unit may also schedule wafers and/or wafer lots that were recently processed in the identified processing tools for metrology and/or contamination free manufacture defect inspection.

Embodiments of the techniques described above may achieve greater overall total control by coordinating the operation of multiple control units, e.g., using a total tool controller 170 such as shown in FIG. 1. The likelihood that multiple tool control units may issue instructions that compete against each other may also be reduced by coordinating operation of the control units. Furthermore, control units may be used to check or verify operations performed according to instructions from other control units. For example, the total tool controller may verify decisions made by a less reliable fault detection control unit using information provided by a more reliable fault detection control unit. Accordingly, the yield, performance, and capital productivity of the manufacturing facility may be increased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising: accessing information indicative of at least one excursion of at least one processing tool detected by a first control unit associated with said at least one processing tool; determining at least one action to be taken by at least one second control unit associated with said at least one processing tool based on the information indicative of said at least one excursion, wherein accessing the information indicative of the at least one excursion comprises accessing a fault detection and control signal, a statistical process control chart, and a result of a wafer electrical test.

2. The method of claim 1, wherein accessing the information indicative of the at least one excursion comprises accessing a fault detection and control signal indicating a failure.

3. The method of claim 1, wherein accessing the information indicative of the at least one excursion comprises accessing a non-critical statistical process control chart indicating a trend.

4. The method of claim 3, wherein determining at least one action to be taken by the at least one second control unit comprises determining at least one parameter to be used by at least one of a dynamic adaptive sampling control unit, a run-to-run control unit, a statistical process control unit, and a fault detection and control unit.

5. The method of claim 3, further comprising re-routing at least one workpiece based on the non-critical statistical process control chart.

6. The method of claim 1, wherein accessing the information indicative of the at least one excursion comprises accessing a critical statistical process control chart indicating a failure.

7. The method of claim 6, wherein determining at least one action to be taken by the at least one second control unit comprises selecting at least one wafer lot for at least one of defect inspection, metrology, and wafer electrical testing.

8. The method of claim 7, wherein selecting the at least one wafer lot comprises determining at least one priority associated with the at least one selected wafer lot.

9. The method of claim 6, further comprising selecting a plurality of wafer lots associated with the critical statistical process control chart.

10. The method of claim 9, wherein determining at least one action to be taken by the at least one second control unit comprises determining that a report based on the selected plurality of wafer lots is to be formed by at least one of a dynamic adaptive sampling control unit, a run-to-run control unit, a statistical process control unit, and a fault detection and control unit.

11. The method of claim 9, further comprising performing a commonality analysis based on the selected plurality of wafer lots associated with the critical statistical process control chart.

12. The method of claim 1, wherein accessing the information indicative of the at least one excursion comprises accessing information indicative of at least one of a failure in a wafer electrical test or a trend in a wafer electrical test.

13. The method of claim 12, wherein determining at least one action to be taken by the at least one second control unit comprises determining that a fault detection and control unit is to extract at least one of metrology data, a statistical process control chart, and run-to-run data associated with at least one processing tool.

14. The method of claim 13, further comprising forming a report based on the extracted data.

15. The method of claim 12, wherein determining at least one action to be taken by the at least one second control unit comprises:
 selecting at least one wafer lot associated with at least one of a critical statistical process control chart and a fault detection and control failure; and
 identifying at least one processing tool that processed at least one of the selected wafer lots.

16. The method of claim 1, further comprising providing information indicative of the at least one determined action to at least one second control unit and processing at least one workpiece based on the provided information.

17. A method, comprising:
 accessing information indicative of at least one excursion of at least one processing tool detected by a first control unit associated with said at least one processing tool, wherein accessing the information indicative of the at least one excursion comprises accessing at least one of a fault detection and control signal indicating a failure, a statistical process control chart, and a result of a wafer electrical test; and
 determining at least one action to be taken by at least one second control unit associated with said at least one processing tool based on the information indicative of said at least one excursion, wherein determining at least one action to be taken by the at least one second control unit comprises at least one of determining at least one wafer lot to be marked for contamination free manufacture monitoring by a dynamic adaptive sampling control unit, determining at least one sampling rate to be modified by the dynamic adaptive sampling control unit, determining at least one chart to be modified by a statistical process control unit, and determining at least one gain to be modified by a run-to-run control unit.

18. A method, comprising:
 accessing information indicative of at least one excursion of at least one processing tool detected by a first control unit associated with said at least one processing tool, wherein accessing the information indicative of the at least one excursion comprises accessing at least one of a fault detection and control signal, a statistical process control chart, and a result of a wafer electrical test, and wherein accessing the information indicative of the at least one excursion comprises accessing information indicative of at least one of a failure or a trend in a wafer electrical test; and
 determining at least one action to be taken by at least one second control unit associated with said at least one processing tool based on the information indicative of said at least one excursion, wherein determining at least one action to be taken by the at least one second control unit comprises:
 selecting at least one wafer lot associated with at least one of a critical statistical process control chart and a fault detection and control failure; and
 identifying at least one processing tool that processed at least one of the selected wafer lots; and
 wherein determining at least one action to be taken by the at least one second control unit comprises determining that a dynamic adaptive sampling control unit is to reroute wafer lots to at least one processing tool that was not identified as having processed at least one of the selected wafer lots.

19. A method, comprising:
 accessing information indicative of at least one excursion of at least one processing tool detected by a first control unit associated with said at least one processing tool, wherein accessing the information indicative of the at least one excursion comprises accessing at least one of a fault detection and control signal, a statistical process control chart, and a result of a wafer electrical test, and wherein accessing the information indicative of the at least one excursion comprises accessing information indicative of at least one of a failure or a trend in a wafer electrical test; and
 determining at least one action to be taken by at least one second control unit associated with said at least one processing tool based on the information indicative of said at least one excursion, wherein determining at least one action to be taken by the at least one second control unit comprises:
 selecting at least one wafer lot associated with at least one of a critical statistical process control chart and a fault detection and control failure; and
 identifying at least one processing tool that processed at least one of the selected wafer lots; and
 wherein determining at least one action to be taken by the at least one second control unit comprises determining that a dynamic adaptive sampling control unit is to select additional wafer lots processed by at least one processing tool that was identified as having processed at least one of the selected wafer lots for metrology or defect inspection.

20. An apparatus, comprising: means for accessing information indicative of at least one excursion of at least one processing tool detected by a first control unit associated with said at least one processing tool; means for determining at least one action to be taken by at least one second control unit associated with said at least one processing tool based on the information indicative of said at least one excursion, wherein accessing the information indicative of the at least one excursion comprises accessing a fault detection and control signal, a statistical process control chart, and a result of a wafer electrical test.

21. An apparatus, comprising: at least one, processing tool; a first control unit and at least one second control unit, the first and second control units being associated with said at least one processing tool; and a controller configured to access information indicative of at least one excursion of said at least one processing tool detected by the first control unit and determine at least one action to be taken by said at least one second control unit based on the information indicative of said at least one excursion, wherein the first control unit a fault detection and control unit, a statistical process control unit, and a wafer electrical test control unit, and wherein the controller is configured to access at least one of a fault detection and control signal, a statistical process control chart, and a result of a wafer electrical test.

22. The method of claim 21, wherein the controller is configured to determine that the fault detection and control signal indicates a failure.

23. The apparatus of claim 21, wherein the controller is configured to access a non-critical statistical process control chart indicating a trend.

24. The apparatus of claim 23, wherein the controller is configured to determine at least one parameter to be used by at least one of dynamic adaptive sampling control unit, a run-to-run control unit, a statistical process control unit, a fault detection and control unit, a defect monitor control unit, and a wafer electrical test control unit.

25. The apparatus of claim 23, further comprising a dynamic adaptive sampling control unit configured to re-route at least one workpiece based on the non-critical statistical process control chart.

26. The apparatus of claim 21, wherein the controller is configured to access a critical statistical process control chart indicating a failure.

27. The apparatus of claim 26, wherein the controller is configured to select at least one wafer lot for at least one of defect inspection, metrology, and wafer electrical testing.

28. The apparatus of claim 27, wherein the controller is configured to determine at least one priority associated with the at least one selected wafer lot.

29. The apparatus of claim 26, wherein the controller is configured to select a plurality of wafer lots associated with the critical statistical process control chart.

30. The apparatus of claim 29, wherein the controller is configured to determine that a report based on the selected plurality of wafer lots is to be formed by at least one of a dynamic adaptive sampling control unit, a run-to-run control unit, a statistical process control unit, a fault detection and control unit, a defect monitor control unit, and a wafer electrical test control unit.

31. The apparatus of claim 29, wherein the controller is configured to perform a commonality analysis based on the selected plurality of wafer lots associated with the critical statistical process control chart.

32. The apparatus of claim 21, wherein the controller is configured to access information indicative of at least one of a failure in a wafer electrical test or a trend in a wafer electrical test.

33. The apparatus of claim 32, wherein the controller is configured to determine that a fault detection and control unit is to extract at least one of metrology data, a statistical process control chart, and run-to-run data associated with at least one processing tool.

34. The apparatus of claim 33, wherein the controller is configured to form a report based on the extracted data.

35. The apparatus of claim 32, wherein the controller is configured to:
select at least one wafer lot associated with at least one of a critical statistical process control chart and a fault detection and control failure; and
identify at least one processing tool that processed at least one of the selected wafer lots.

36. The apparatus of claim 21, wherein the controller is configured to provide information indicative of the at least one determined action to at least one second control unit and wherein said at least one processing tool is configured to process at least one workpiece based on the provided information.

37. An apparatus, comprising:
at least one processing tool;
a first control unit and at least one second control unit, the first and second control units being associated with said at least one processing tool, wherein the first control unit is selected from a group consisting of a fault detection and control unit, a statistical process control unit, and a wafer electrical test control unit, and wherein said at least one second control unit is selected from a group consisting of a dynamic adaptive sampling controller, a run-to-run controller, a fault detection and control unit, a statistical process control unit, a defect monitor control unit, and a wafer electrical test control unit; and
a controller configured to access information indicative of at least one excursion of said at least one processing tool detected by the first control unit and determine at least one action to be taken by said at least one second control unit based on the information indicative of said at least one excursion, wherein the controller is configured to access at least one of a fault detection and control signal, a statistical process control chart, and a result of a wafer electrical test, wherein the controller is configured to determine that the fault detection and control signal indicates a failure, and wherein the controller is configured to determine at least one action selected from a group consisting of determining at least one wafer lot to be marked for contamination free manufacture monitoring by the dynamic adaptive sampling control unit, determining at least one sampling rate to be modified by the dynamic adaptive sampling control unit, determining at least one chart to be modified by the statistical process control unit, and determining at least one gain to be modified by the run-to-run control unit.

38. An apparatus, comprising:
at least one processing tool;
a first control unit and at least one second control unit, the first and second control units being associated with said at least one processing tool, wherein the first control unit is selected from a group consisting of a fault detection and control unit, a statistical process control unit, and a wafer electrical test control unit; and a controller configured to access information indicative of at least one excursion of said at least one processing tool detected by the first control unit and determine at least one action to be taken by said at least one second control unit based on the information indicative of said at least one excursion, wherein the controller is configured to access at least one of a fault detection and control signal, a statistical process control chart, and a result of a wafer electrical test, wherein the controller is configured to access information indicative of at least one of a failure or a trend in a wafer electrical test, wherein the controller is configured to:

select at least one wafer lot associated with at least one of a critical statistical process control chart and a fault detection and control failure; and identify at least one processing tool that processed at least one of the selected wafer lots; and wherein the controller is configured to determine that a dynamic adaptive sampling control unit is to reroute wafer lots to at least one processing tool that was not identified as having processed at least one of the selected wafer lots.

39. An apparatus, comprising:

at least one processing tool;

a first control unit and at least one second control unit, the first and second control units being associated with said at least one processing tool, wherein the first control unit is selected from a group consisting of a fault detection and control unit, a statistical process control unit, and a wafer electrical test control unit; and a controller configured to access information indicative of at least one excursion of said at least one processing tool detected by the first control unit and determine at least one action to be taken by said at least one second control unit based on the information indicative of said at least one excursion, wherein the controller is configured to access at least one of a fault detection and control signal, a statistical process control chart, and a result of a wafer electrical test, wherein the controller is configured to access information indicative of at least one of a failure or a trend in a wafer electrical test, wherein the controller is configured to:

select at least one wafer lot associated with at least one of a critical statistical process control chart and a fault detection and control failure; and identify at least one processing tool that processed at least one of the selected wafer lots; and wherein the controller is configured to determine that a dynamic adaptive sampling control unit is to select additional wafer lots processed by at least one processing tool that was identified as having processed at least one of the selected wafer lots for metrology or defect inspection.

* * * * *